United States Patent
Roodenko

(10) Patent No.: US 11,344,883 B2
(45) Date of Patent: May 31, 2022

(54) MICROFLUIDIC DEVICE WITH INTEGRATED WAVEGUIDES FOR ANALYTE IDENTIFICATION AND METHOD OF OPERATION THEREOF

(71) Applicant: Max-IR Labs Incorporated, Dallas, TX (US)

(72) Inventor: Ecatherina Roodenko, Plano, TX (US)

(73) Assignee: MAX-IR LABS INCORPORATED, Plano, TX (US)

( * ) Notice: Subject to any disclaimer, the term of this patent is extended or adjusted under 35 U.S.C. 154(b) by 182 days.

(21) Appl. No.: 16/551,301

(22) Filed: Aug. 26, 2019

(65) Prior Publication Data

US 2020/0070162 A1    Mar. 5, 2020

Related U.S. Application Data

(60) Provisional application No. 62/723,495, filed on Aug. 28, 2018.

(51) Int. Cl.
*B01L 3/00* (2006.01)
*G01N 21/3577* (2014.01)
*G01N 21/552* (2014.01)

(52) U.S. Cl.
CPC .... *B01L 3/502715* (2013.01); *G01N 21/3577* (2013.01); *G01N 21/552* (2013.01); *B01L 2300/041* (2013.01); *B01L 2300/046* (2013.01); *B01L 2300/06* (2013.01); *B01L 2300/0816* (2013.01); *B01L 2300/168* (2013.01); *G01N 2201/08* (2013.01)

(58) Field of Classification Search
CPC ........ B01L 3/502715; B01L 2300/041; B01L 2300/168; B01L 2300/046; B01L 2300/0816; B01L 2300/06; B01L 3/502761; G01N 21/3577; G01N 21/552; G01N 2201/08
See application file for complete search history.

(56) References Cited

U.S. PATENT DOCUMENTS

| | | | | |
|---|---|---|---|---|
| 5,165,005 A | * | 11/1992 | Klainer | G01N 21/431 356/128 |
| 2011/0024630 A1 | * | 2/2011 | Sundaram | G01N 21/552 250/339.08 |
| 2012/0105827 A1 | * | 5/2012 | Carter | G01N 21/65 356/51 |
| 2016/0178531 A1 | * | 6/2016 | Nicq | B64C 11/26 356/364 |
| 2020/0055048 A1 | * | 2/2020 | Alvarez-Puebla | B01L 3/502715 |

* cited by examiner

*Primary Examiner* — Jennifer Wecker
*Assistant Examiner* — Oyeleye Alexander Alabi
(74) *Attorney, Agent, or Firm* — Ferguson Braswell Fraser Kubasta PC

(57) ABSTRACT

A microfluidic device and a method of detecting the presence of an analyte in a fluid. In one embodiment, the microfluidic device includes: (1) a substrate, (2) a waveguide supported by the substrate and configured to receive light and (3) a microfluidic channel contacting the waveguide and configured to convey a fluid, a characteristic of the light changing under influence of an analyte in the fluid.

17 Claims, 10 Drawing Sheets

US 11,344,883 B2

MICROFLUIDIC DEVICE WITH INTEGRATED WAVEGUIDES FOR ANALYTE IDENTIFICATION AND METHOD OF OPERATION THEREOF

CROSS-REFERENCE TO RELATED APPLICATION(S) AND CLAIM OF PRIORITY

The present application is related to U.S. Provisional Patent Application No. 62/723,495, filed Aug. 28, 2018, entitled "Microfluidic Device With Integrated Infrared Waveguides for Rapid Bacterial Identification in Biomedical Research and Diagnostics". U.S. Provisional Patent Application No. 62/723,495 is assigned to the assignee of the present application and is hereby incorporated by reference into the present application as if fully set forth herein. The present application hereby claims priority under 35 U.S.S. § 119(e) to U.S. Provisional Patent Application No. 62/723,495.

TECHNICAL FIELD

The present disclosure is directed, in general, to analyte identification and, more specifically, to a microfluidic device with integrated infrared waveguides and a method of operating the same to detect the presence of an analyte.

BACKGROUND

Urinary tract infections (UTI), both community-acquired and nosocomial, impose a large economic burden on health care systems, both nationally and world-wide (see, e.g., Wilke, et al., "Healthcare Burden and Costs Associated with Urinary Tract Infections in Type 2 Diabetes Mellitus Patients: An Analysis Based on a Large Sample of 456,586 German Patients," Nephron. 132, 215 (2016)). The estimated cost for hospitalization for UTIs in 2011 was $2.8 billion, accounting for approximately 400,000 incidents, with an increase of 52% between 1998 and 2011 (see, e.g., Simmering, et al., "The Increase in Hospitalizations for Urinary Tract Infections and the Associated Costs in the United States, 1998-2011," Open Forum Infect. Dis. 4, 1 (2017)). Emergence of drug-resistant pathogens is one of the driving factors behind these trends. Bacterial antibiotic resistance is on the rise due to the overuse of broad-spectrum antibiotic therapy, incorrect drug prescription, and other factors such as the widespread use of antibiotics in agriculture. Fast, direct methods for bacterial testing of urine samples can aid health professionals in objective diagnosis and informed decision making, reducing the risks of incorrect antibiotic prescription.

Currently, some clinical practices for UTI diagnosis involve screening by colorimetric dipstick. This test, however, can provide false-negative results and the accuracy of the dipstick test alone for infection diagnosis is doubtful. Bacterial identification therefore is performed in microbiology laboratories and requires culturing on agar plates, followed by analytical methods such as polymerase chain reaction (PCR); electrophoresis; pulsed-field gel electrophoresis (PFGE); or Matrix-Assisted Laser Desorption/Ionization Time of Flight Mass Spectrometry (MALDI-TOF MS). Pathogen identification requires trained personnel and about 24 hours for MALDI-TOF MS to 3-4 days with PFGE. Conventional automated systems approved for pathogen detection such as VITEK® 2 (commercially available from bioMérieux SA of Marcy-l'Étoile, France), MicroScan® (commercially available from Siemens Healthineers AG of Munich, Germany), and Phoenix™ (commercially available from Becton Dickinson, Inc., of Franklin Lakes, N.J., USA) are time consuming and restricted, as a practical matter, for laboratory use, distant from the location of the person being diagnosed (the "point-of-care").

SUMMARY

One aspect provides a microfluidic device. In one embodiment, the microfluidic device includes: (1) a substrate, (2) a waveguide supported by the substrate and configured to receive light and (3) a microfluidic channel contacting the waveguide and configured to convey a fluid, a characteristic of the light changing under influence of an analyte in the fluid.

Another embodiment of the microfluidic device includes: (1) a substrate, (2) a waveguide supported by the substrate and configured to convey light from a first end face to a second end face thereof, (3) a light source configured to provide light to the first end face, (4) a light detector configured to receive light from the second end face and produce a signal based thereon and (5) a microfluidic channel contacting the waveguide and configured to convey a fluid, a characteristic of the light changing under influence of an analyte in the fluid, the characteristic being evident in the signal.

Another aspect provides a method of detecting the presence of an analyte in a fluid. In one embodiment, the method includes: (1) causing light to propagate through a waveguide supported by a monolithic substrate and (2) causing a fluid containing an analyte to be conveyed through a microfluidic channel contacting the waveguide, a characteristic of the light changing under influence of an analyte in the fluid.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
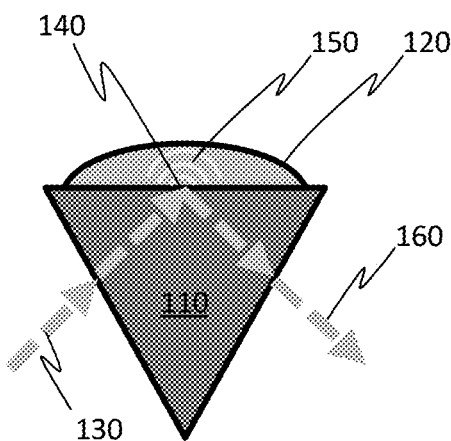
FIG. 1A is a sectional view of a portion of a waveguide illustrating the creation of an evanescent field at a surface thereof.

As described above, conventional automated systems approved for pathogen detection are time-consuming and not appropriate for use at the point-of-care. It is realized herein that direct urine testing, preferably proximate the point-of-care, would reduce diagnostic delay and expedite treatment.

Numerous attempts have been made to perform IR sensing within microfluidic channels. For example, Chan, et al., "Chemical Imaging of Microfluidic Flows Using ATR-FTIR Spectroscopy," Lab Chip 9, 2909 (2009) is directed to use of polydimethylsiloxane (PDMS)-based microfluidics placed on top of a zinc selenide (ZnSe) IR ATR with an IR focal plane array (FPA) signal read out. This method is impractical, as it requires expensive IR FPAs with a relatively large resolution. Without the FPA, it is not possible to distinguish between different fluids in different channels, as the same beam probes the entire PDMS chip and all its contents, and limits this application to laboratories with highly skilled personnel. Chang, et al., "Mid IR Waveguide Spectroscopy for Cocaine Detection in Liquid Environments," Proceedings of the EOS Annual Meeting, 6025 (2012) is directed to fabrication of a germanium (Ge) strip on a silicon (Si) wafer, without any fluidic channels, but with PDMS glued on top of the wafer, providing inlets for a liquid that floods the volume beneath. This approach is limited due complications related to Ge deposition on Si surface due to material lattice mismatches. Floyd, et al., "Silicon Micromixers with Infrared Detection for Studies of Liquid-Phase Reactions," Ind. Eng. Chem. Res. 44, 2351 (2005) reported fabrication of microfluidic channels in a Si substrate. However, Floyd, et al., teaches the transmission of IR radiation through the entire Si chip, collecting data from the entire device rather than along the individual channels.

Introduced herein are various embodiments of a microfluidic device capable of optically detecting the presence of an analyte, such as bacteria, in a fluid, such as a bodily fluid. Certain embodiments of the device employ integrated one or more IR waveguides alongside one or more microfluidic channels, allowing an analyte in the fluid to interact with light propagating through the channels. Also introduced herein are various embodiments of a method of detecting the presence of an analyte in a fluid using a microfluidic device. Some embodiments of the device and method are directed to detecting a UTI by detecting the presence of bacteria in urine which has flowed through an infected urinary tract. However, many embodiments of the device and method are not limited to UTI detection, but rather are useful in research, forensics, pharmacology, freshwater analysis and waste treatment. These embodiments may be capable of detecting one or more of: a bacterium, a peptide, a lipid, a protein, a virus, a cell and a fungus.

For example, embodiments of the microfluidic device and method disclosed herein are appropriate for a variety of applications. Rapid bacterial detection can be put into use in the water safety and food industry, preventing spread of bacterial infections. In forensics, the microfluidic device and method can be used in light absorption analysis and identification of minute quantities of analytes retrieved from crime scenes. The microfluidic device and method may be useful in Alzheimer's disease research, particularly for studying secondary protein structure. These are but a few examples.

In general, various embodiments of the microfluidic device and method are suitable for providing information on bacterial presence/absence using a light absorption signal and providing bacterial identification, based on detection of the light absorption signal, followed by a statistical analysis of spectra to perform bacterial identification.

Various embodiments of the microfluidic device and method exhibit enhanced sensitivity by including one or more of the following features:

(a) initial separation of bacteria in the microchannels. Methods such as chemotaxis gradient, or electric field gradient can aid in bacterial separation within the microchannels. Once separated and detected by light, bacterial classification can be performed by the algorithms where the specific input on the separation method is used to aid in final bacterial identification.

(b) implementation of surface enhanced IR absorption (SEIRA), where a functionalized nanoparticulate film is deposited on the waveguide surfaces. The electric field that builds up within the (e.g., gold) film enhances signal due to vibrational bands of analyte proximate the waveguide surface. An example of signal enhancement by SEIRA is described in Hinrichs, et al., "Surface-Enhanced Infrared Absorption: Infrared Ellipsometry of Au Evaporated Ultrathin Organic Films," Appl. Spectrosc. 62, 121 (2008).

(c) immobilization of bacteria using a bioreceptor film coating on the waveguide surfaces. Bioreceptors can be catalytic (e.g., enzyme) or affinity based (e.g., antibody, aptamer, lectin or bacteriophage (see, e.g., Ahmed, et al., Biosensors for Whole-Cell Bacterial Detection, Clin Microbiol Rev. 2014 July; 27(3): 631-646). Antibody attachment to the walls of a waveguide promotes specific interaction between an antibody and the target antigen on the bacterial cell surface that results in immunoimmobilization. Immobilization of bacteria on the waveguide surface enhances the signal due to the close proximity of bacteria to the probing beam. It also provides enhanced specificity, due to highly selective binding for a given species.

(d) a combination of the above techniques, whereby metallic nanoparticles functionalized with bioreceptors are injected into the microchannels. Immunoimmobilization then occurs on the surfaces of the nanoparticles. The nanoparticles can be then directly sensed by the probing attenuated total reflectance (ATR) radiation. If the walls of the waveguides are functionalized to promote binding of the nanoparticles, the sensitivity can be further enhanced by the combined effect of the proximity of the nanoparticles with immobilized bacterial cells and by the SEIRA. An example of such functionalization for subsequent nanoparticle attachment is given in Aureau, et al., "Controlled Deposition of Gold Nanoparticles on Well-Defined Organic Monolayer Grafted on Silicon Surfaces," J. Phys. Chem. C 114, 14180 (2010).

FIG. 1A is a sectional view of a portion of a waveguide 110 illustrating the creation of an evanescent field at a surface thereof. The waveguide 110 portion adjoins a fluid 120. Light propagates through the waveguide 110 portion, illustrated by an incoming arrow 130. The light reflects off a point 140 on the surface (unreferenced) of the waveguide 110 portion, creating an evanescent field 150 in a region of the fluid 120. The light then exits the waveguide 110 portion, illustrated by an outgoing arrow 160. The principle underlying the operation of the microfluidic device and method embodiments disclosed herein is that analyte present in the evanescent field 150 will interact with it, and through it change the spectral characteristics of the light propagating in the waveguide 110 portion. This is ATR. In general, the change takes the form of wavenumber-dependent absorption. The spectral characteristics may then be measured, providing information about the identity and concentration or the molecular absorption bands of the analyte. In various specific embodiments, the analyte effects an absorbance of particular wavenumbers of the light, and the absorbance spectrum may be analyzed to learn the identity and concentration or the molecular absorption bands of the analyte.

Figure 1B:
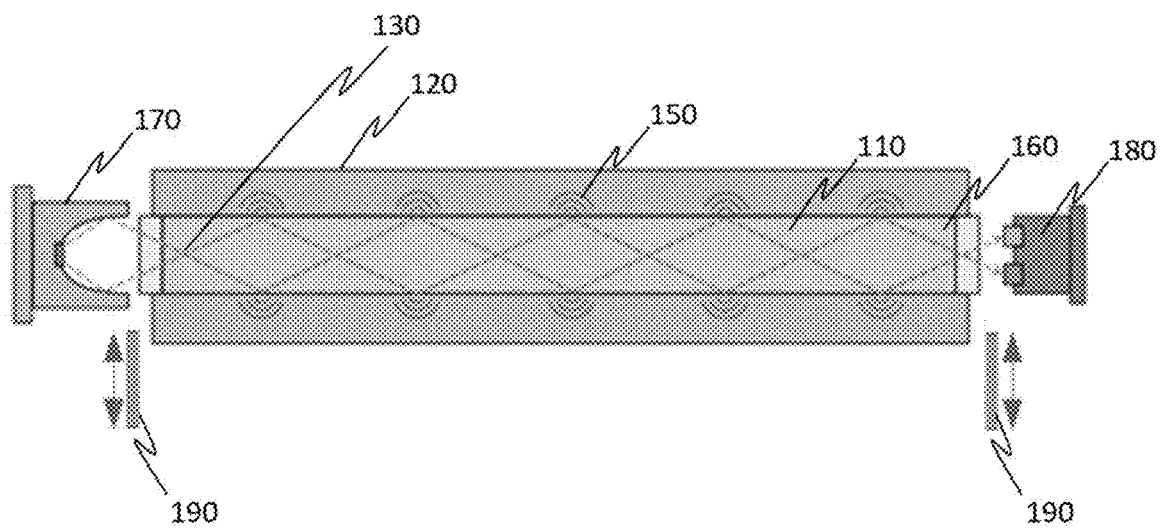
FIG. 1B is a sectional view of a waveguide illustrating the creation of multiple evanescent fields at a surface thereof.

FIG. 1B is a sectional view of a waveguide illustrating the creation of multiple evanescent fields at a surface thereof. FIG. 1B illustrates one embodiment of a device employing the principle of FIG. 1A. FIG. 1B illustrates an elongated waveguide 110 and adjoining a fluid 120 along its length. Light (indicated by the arrow 130) enters the waveguide 110, propagating therealong, reflecting off its surface (unreferenced) many times, creating many evanescent fields 150 along the length of the waveguide 110 before exiting, as the arrow 160 indicates. FIG. 1B also illustrates a light source 170 situated to provide light into the waveguide 110 and a light detector 180 situated to receive the light from the waveguide 110 and produce an electric signal as a function thereof. According to the principle set forth above, the light exiting the waveguide 110 and received by the light detector 180 contains spectral characteristics that are changed by one or more analytes in the fluid 120 that are in, or pass through, the evanescent fields 150. The signal produced by the light detector 180 may then be analyzed to identify and determine the concentration or molecular absorption bands of the analyte in the fluid 120.

As will be further described below, some embodiments of the microfluidic device employ a single light source 170 to provide light to multiple waveguides, and other embodiments employ a single light detector 180 to receive light from multiple waveguides. Some embodiments employ both a single light source 170 and a single light detector 180. In all of these embodiments, it may be advantageous to alternate the single light source 170 and/or single light detector 180 among the multiple waveguides in a time-dependent manner (which may be regarded as time-domain multiplexing). Therefore, FIG. 1B further illustrates shutters 190 (not separately referenced). One of the shutters 190 is located between the light source 170 and the waveguide 110. This shutter 190 is configured intermittently to block light produced by the light source 170 from entering the waveguide 110. Another of the shutters 190 is located between waveguide 110 and the light detector 180. This shutter 190 is configured intermittently to block light exiting the waveguide 110 from entering the light detector 180. In the schematic embodiment of FIG. 1B, unreferenced arrows imply that the shutters 190 translate between unblocking and blocking positions. However, those skilled in the pertinent art will understand that shutters may take many alternative forms and change states or positions in many alternative ways.

Figure 2:
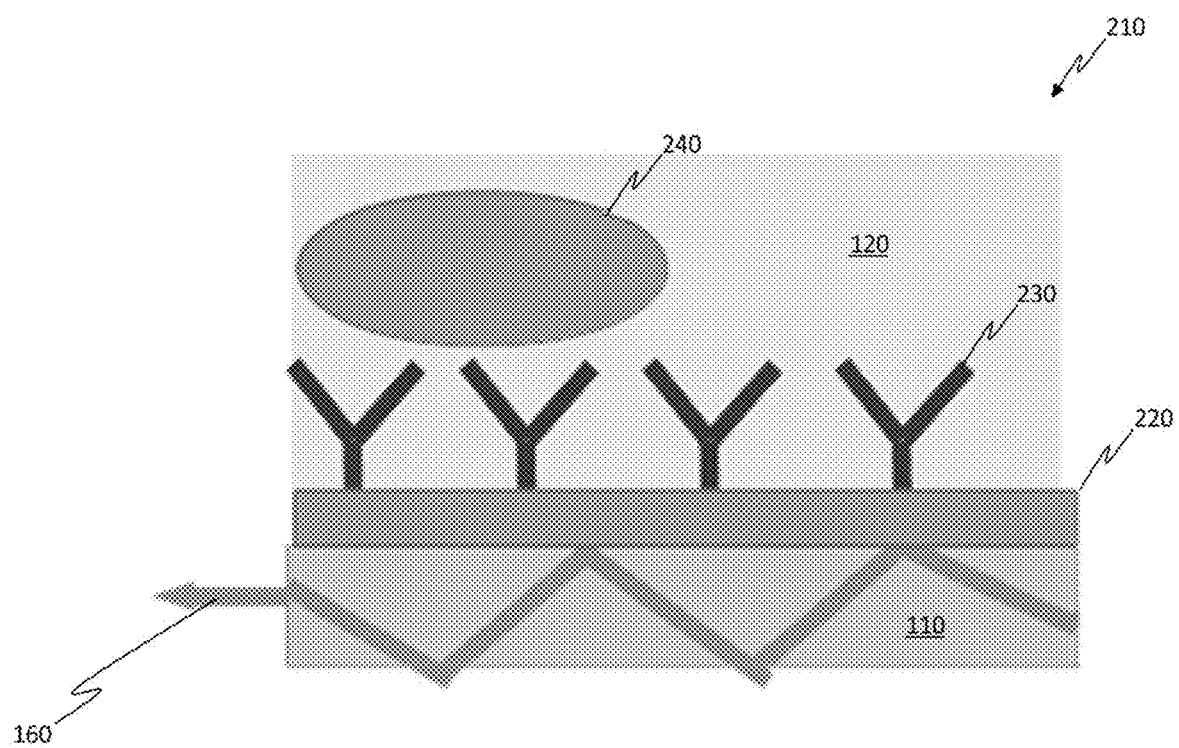
FIG. 2 is schematically illustrates one way in which bacteria may bind to the wall of a microfluidic channel.

Among the vast array of analyte that various embodiments of the microfluidic device and method may assess are bacteria. FIG. 2 is schematically illustrates one way in which bacteria may influence the propagation of light in a waveguide 110. In the specific embodiment of FIG. 2, a fluid 120, such as water or urine, is contained in a microfluidic channel 210 having a wall 220 that forms the surface of a waveguide 110. Light propagates through the waveguide, reflecting off the wall 220 in multiple locations and creating evanescent fields (not shown) about those locations that extend into the fluid 120 contained in the microfluidic channel 210. The arrow 160 denotes the light exiting the waveguide 110.

Receptors 230 coat the wall 220 of the microfluidic channel 210. The receptors 230 are configured to bind to bacteria (one or multiple types or specie of bacteria, depending upon the embodiment). When an example bacterium 240 comes in contact with one or more receptors, it is bound thereto and begins to influence any evanescent field in range of the receptor. This influence, in turn, changes the spectral characteristics of the IR light propagating in the waveguide 110.

Figure 3:
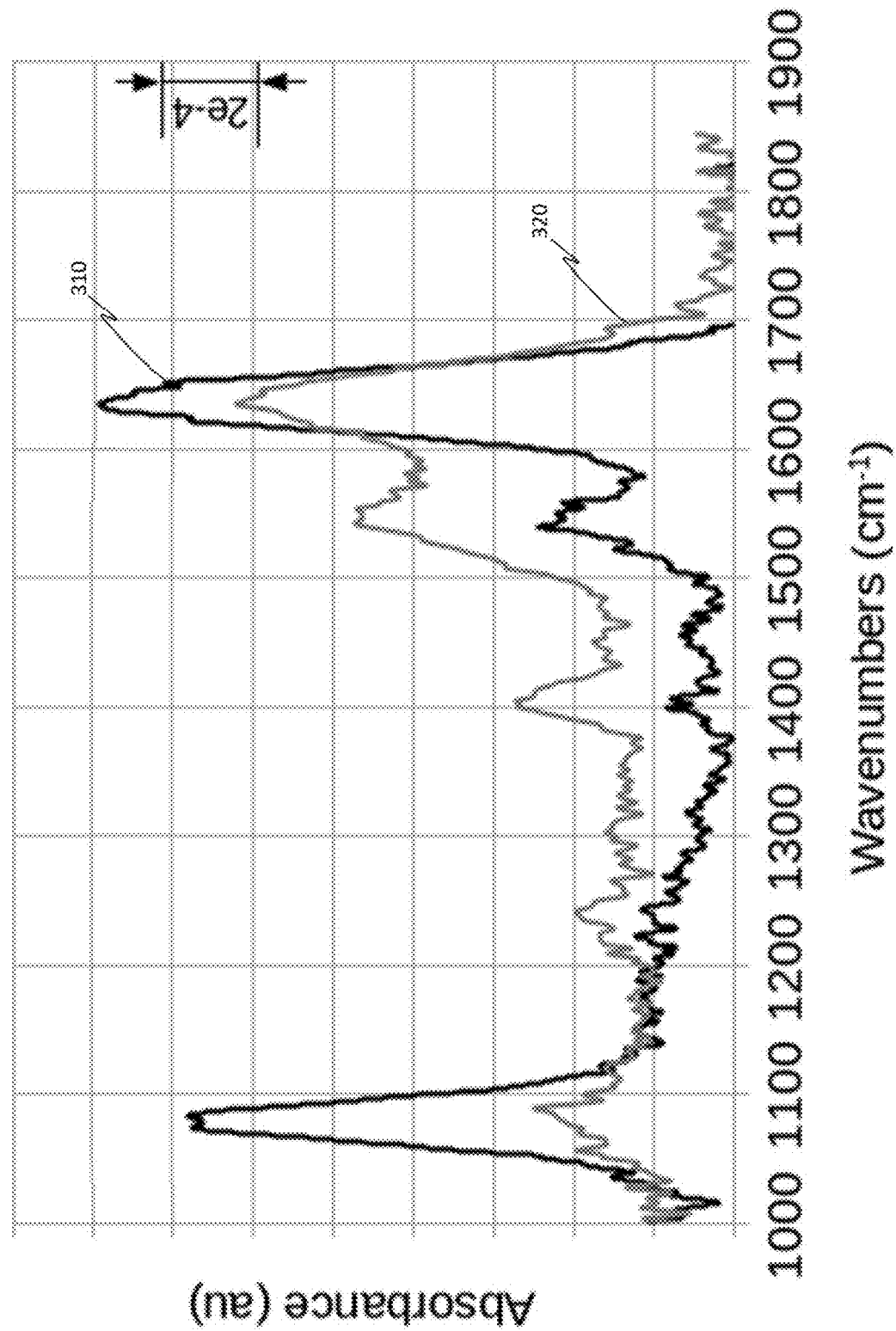
FIG. 3 is a graph of a Fourier transform infrared (FTIR) spectrum illustrating the interaction of *Escherichia coli* (*E. coli*) bacteria with the evanescent field of propagating infrared (IR) light.

FIG. 3 is a graph of an FTIR spectrum illustrating the interaction of E. coli bacteria with evanescent fields produced by reflections of IR light propagating through a waveguide. The graph shows an IR portion of a spectrum spanning wavenumbers between 1000 $cm^{-1}$ and 1900 $cm^{-1}$ and two curves. A first spectrum 310 indicates the presence of E. coli in a phosphate buffered saline solution (PBS). A second spectrum 320 indicates the presence of E. coli in a lysogeny broth (LB).

The spectra 310, 320 show typical absorption peaks due to amide I and II bands of proteins and peptides in the 1700-1500 $cm^{-1}$ range; fatty acid bending vibrations, proteins, and phosphate-carrying compounds in the 1500-1200 $cm^{-1}$ range; and absorption bands of the carbohydrates in microbial cell walls in the 1200-900 $cm^{-1}$ range (see, e.g., Sandt, et al., "FT-IR MicroSpectroscopy for Early Identification of Some Clinically Relevant Pathogens", Journal of Applied Microbiology 101, 785 (2006); and, Quintelas, et al., "An Overview of the Evolution of Infrared Spectroscopy Applied to Bacterial Typing", Biotechnology Journal 2018, 13 (2017)).

FIG. 3 illustrates that, although the surrounding solution matrix varies, the absorption peaks have unique signatures. Coupled with appropriate data analysis techniques, such as principal component analysis (PCA); hierarchical cluster analysis (HCA); canonical variate analysis (CVA); or partial least-squares regression (PLSR), these signatures can serve as the basis for bacterial identification at genus and specie levels, even down to the strain level (see, e.g., Sandt, et al., supra).

Generally, statistical analysis techniques fall into two categories: supervised techniques and unsupervised techniques. PCA and HCA are two examples of unsupervised techniques, in that they extrapolate spectral data without a prior knowledge about the subject bacteria. An artificial neural network (ANN) is an example of supervised techniques, which, in contrast, use a set of spectra from well characterized samples for training for proper identification. Many software packages are commercially available to perform multivariate data analysis, such as TQ Analyst™ software (from Thermo Fisher Scientific, Inc., of Waltham, Mass., USA), PLS_Toolbox™ (from Eigenvector Research, Inc., of Manson, Wash., USA), and the Unscrambler X™ (from CAMO Analytics of Oslo, Norway).

Figure 4B:
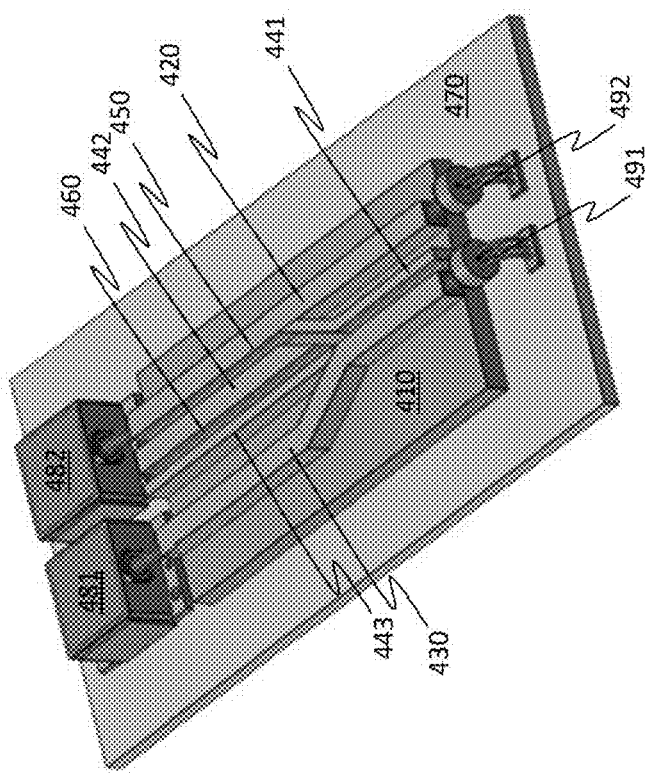
FIG. 4B is an isometric view of one embodiment of a microfluidic device having integrated waveguides together with at least one IR light source and at least one IR light detector proximate ends thereof.
Figure 4A:
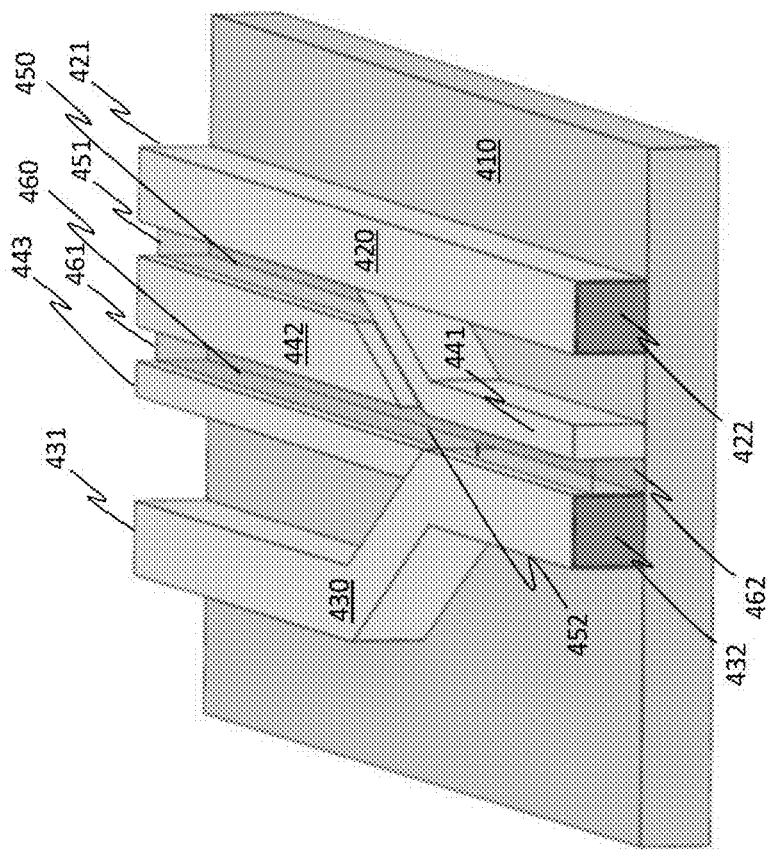
FIG. 4A is an isometric view of one embodiment of a microfluidic device having integrated waveguides.

FIG. 4A is an isometric view of one embodiment of a microfluidic device having integrated waveguides. The device has a monolithic substrate 410 over which are located features that form waveguides and microfluidic channels. The embodiment of FIG. 4A has first and second waveguides 420, 430. The first waveguide 420 has a first end face 421 and a second end face 422. The second waveguide 430 has a first end face 431 and a second end face 432. Features 441, 442, 443 cooperate with the first and second waveguides 420, 430 to form walls for first and second channels 450, 460. The first and second channels 450, 460 may be regarded as merging or splitting, depending upon the direction of fluid flow therein. Therefore, each of the first and second channels 450, 460 has a separate portion and a joint portion (not separately referenced, but apparent in FIG. 4A). The first channel 450 has a first inlet/outlet 451 and a second inlet/outlet 452. The second channel 460 has a first inlet/outlet 461 and shares the second inlet/outlet 452 with the first channel 450.

The main requirement for the first and second waveguides 420, 430 is transparency in a relevant spectral range. For example, embodiments that employ IR light should employ waveguides that are transparent in the IR spectral range. Because the device as a whole may advantageously be monolithic, the transparency requirement may extend to the substrate 410 and the features 441, 442, 443. In various embodiments, the first and second waveguides 420, 430 may be: semiconductor materials, such as Si and Ge; hybrid materials, such as Ge deposited on Si surfaces; ZnSe; potassium bromide (KBr); red bromoiodide (KRS-5); silver halides; chalcogenides; or diamond. In particular, ultrananocrystalline diamond (UNCD) and nanocrystalline diamond (NCD) are widely available. As those skilled in the art are aware, NCD is a thin film of diamond with nanometer size crystals, usually supported on a Si wafer. However, NCD can be grown on many other substrates such as metal, quartz and other transparent glasses and piezoelectric materials. NCD has most of the extreme properties of diamond but at a substantially reduced cost, larger area and more practical form.

Silicon fabrication procedures standard in semiconductor technology, and therefore easily scalable for mass production, may be used to make the microfluidic device. Si waveguide arrays up to several hundred nanometers wide or in diameter can be fabricated by electron-beam lithography (EBL) using a hydrogen silsesquioxane (HSQ) resist, followed by plasma etching for pattern transfer. For deeper structures or larger diameter waveguides, deep reactive-ion etching using the Bosch process is well suited.

In case of Si waveguides, nanometer-scaled channels with single-mode (or few-mode) Si core waveguides (typically with a silicon dioxide, or SiO2, cladding) are well-suited for analysis of small amounts of analyte. Larger channels can integrate larger waveguides (several micrometers to several hundreds of micrometers). The advantage of large waveguides is their higher surface area and support of multiple modes, which may support a higher sensitivity. However, larger waveguides may also have the disadvantage of stronger attenuation (due to scattering or absorption of the light within the waveguide material). Therefore a careful geometric design should be considered based on each specific application.

In certain embodiments, a polymer, such as PDMS, may be used to seal the first and second channels 450, 460 to enclose the microfluidic device. Once the first and second channels 450, 460 are sealed, the fluid can be pumped through the first and second channels 450, 460 at a required rate or pressure. In other embodiments, the first and second channels 450, 460 may be left open and unsealed, which may be appropriate for laboratory use, allowing fluid to be introduced into the first and second channels 450, 460 by pipette. These embodiments are appropriate for recording time-dependent reactions, such as adsorption of analytes on the walls of the first and second channels 450, 460.

In the embodiment of FIG. 4A, the first and second channels 420, 430 form a Y-shape. A Y-shape is well-suited to mix and simultaneously characterize fluids using IR absorption spectroscopy. However, other embodiments do not use Y-shaped channels. Instead, various embodiments employ zigzag channels, T-shaped channels, and spiral channels, to name but a few.

FIG. 4B is an isometric view of one embodiment of a microfluidic device having integrated waveguides together with at least one light source and light detector proximate ends thereof. Many of the elements referenced in FIG. 4B were described in reference to FIG. 4A and so will not be described again. FIG. 4B shows the microfluidic device mounted on a supporting substrate 470 along with first and second light sources 481, 482 and first and second light detectors 491, 492. The first light source and first light detector 481, 491 are aligned with ends of the first waveguide 420 to provide light thereto, and the second light source and second light detector 482, 492 are aligned with ends of the second waveguide 430 to receive light therefrom. In an alternative embodiment, a single light source (not shown) provides light to both the first and second waveguides 420, 430. In another alternative embodiment, a single light detector (not shown) receives light from both the first and second waveguides 420, 430. In case of a single light source and a single detector, the distinction between the light detected from waveguide 420 or waveguide 430 can be enabled by equipping each of the waveguides with one or more shutters (illustrated in FIG. 1B). The shutters may be configured intermittently to block light from reaching the light detector. (Thus, only unblocked light would reach the light detector.) In case of multiple sources and a single detector, the pulses in the light sources can be synchronized so that, during any given time period, only light from a specific waveguide reaches the light detector. In the illustrated embodiment, the first and second light sources 481, 482 are tunable quantum cascade lasers (QCLs). QCLs tunable across extended spectral ranges are commercially available from, e.g., Hamamatsu Photonics of Hamamatsu City, Shizuoka, Japan.

The microfluidic device of FIG. 4A is appropriate for use with existing FTIR spectrometers, because it can use the light source and light detector of the FTIR spectrometer. Thus, in the embodiment of FIG. 4A, light from the light source (not shown) of an FTIR spectrometer (not shown) is focused on the first end faces 421, 431 of the first and second waveguides 420, 430. After passing through the device, the light is focused on the light detector (not shown) of the FTIR spectrometer.

The microfluidic device of FIG. 4B is appropriate for use as a stand-alone chip for point-of-care applications, such as bacterial detection in human blood and urine samples, because it has its own light sources 481, 482 and light detectors 491, 492.

The device of FIGS. 4A and 4B may be configured for operation in various ways. Some configurations employ mixing, while others employ separation. Three examples of configurations will now be set forth with the understanding that other configurations fall within the scope of the invention, particularly for channels having a shape other than a Y-shape.

Figure 5:
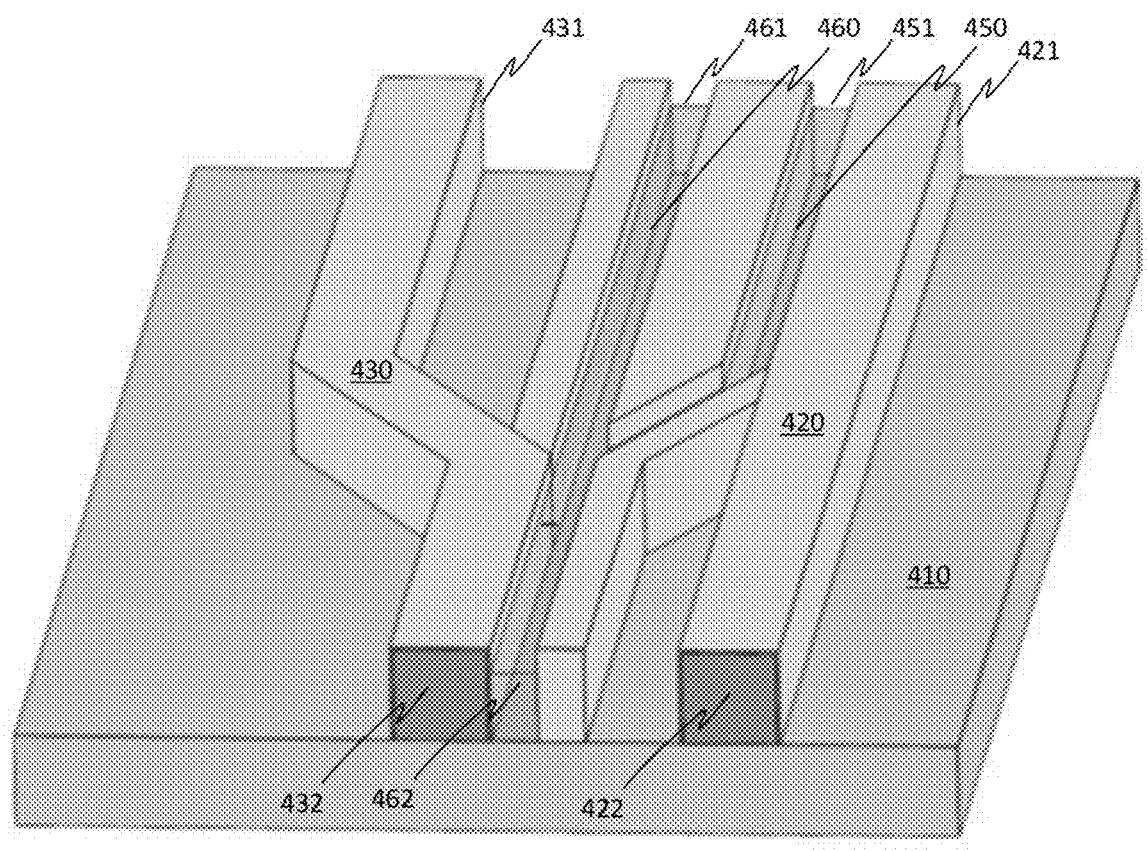
FIG. 5 is an isometric view of the microfluidic device of FIG. 4A operating in a first example configuration.

FIG. 5 is an isometric view of the microfluidic device of FIG. 4A operating in a first example configuration, namely to observe changes in tripeptide glutathione due to pH variations. In this example, IR light is provided to the first end face 431 of the second waveguide 430 and the first end face 421 of the first waveguide 420. After propagation, the IR light emerges from the second end face 422 of the first waveguide 420 and the second end face 432 of the second waveguide 430, where one or more IR detectors (not shown) capture the IR light and produce electrical signals based thereon.

A first fluid (unreferenced) is caused to flow into the first channel 450 via the first inlet/outlet 451 thereof. The first fluid is glutathione in an acidic solution. A second fluid (unreferenced) is caused to flow into the second channel 460 via the first inlet/outlet 461 thereof. The second fluid is provided to change pH and lacks glutathione. The first and second fluids then mix when the first and second channels 450, 460 merge. When the first and second fluids mix, the pH of the fluids moderates, resulting in a protonation of the COOH group in the glutathione, viz:

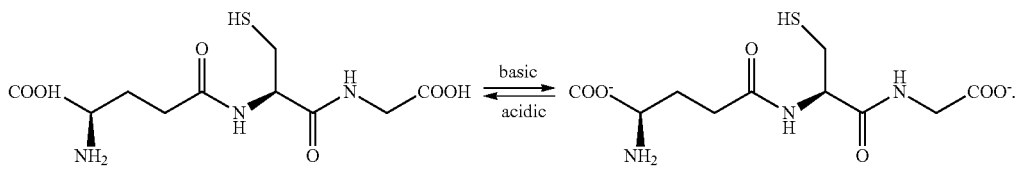

The first and second fluids then exit via the second inlet/outlet 462.

Figure 6:
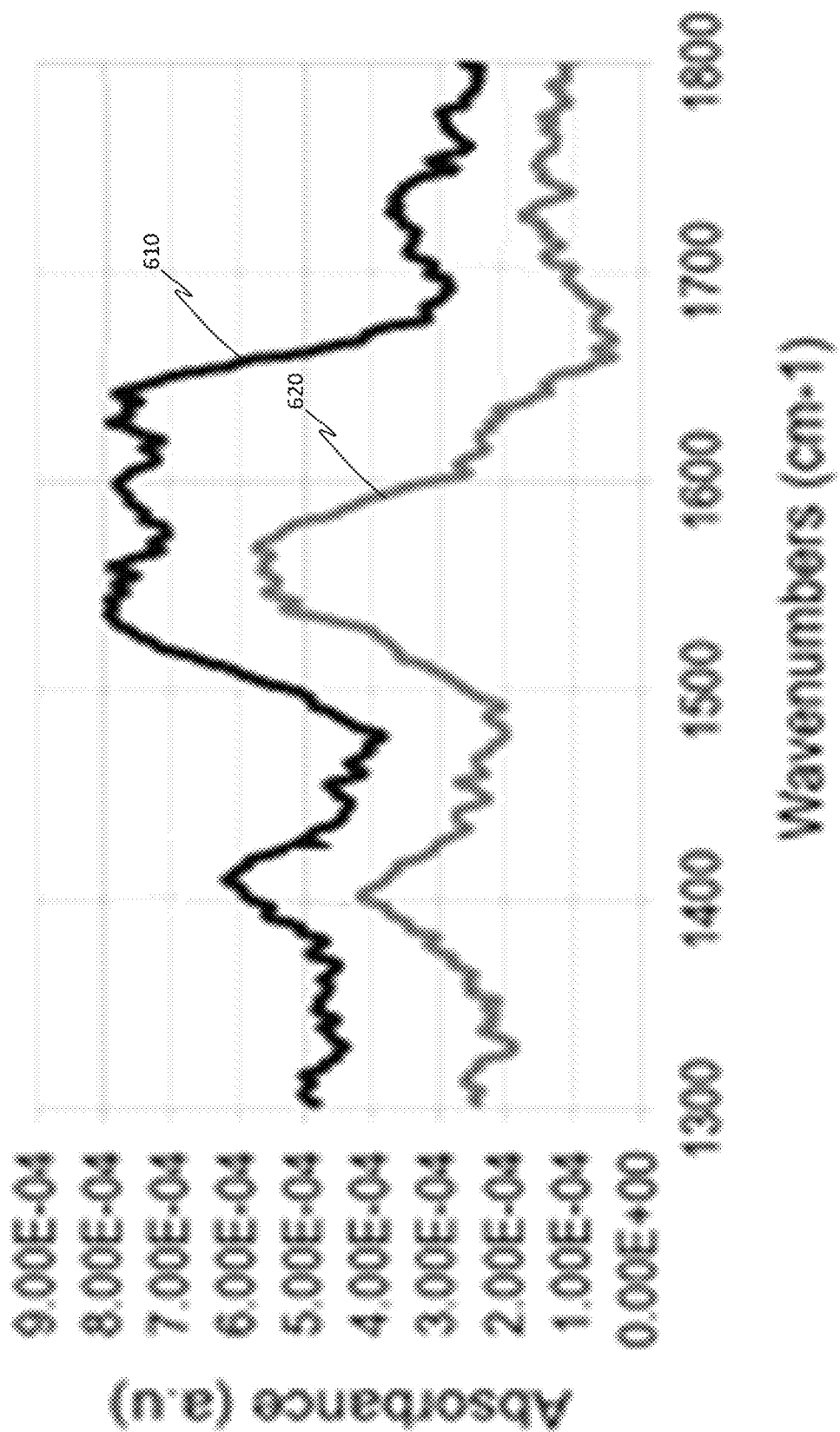
FIG. 6 is a graph of FTIR spectra illustrating the interaction of tripeptide glutathione with the evanescent field of propagating IR light in the first example microfluidic device configuration of FIG. 5.

FIG. 6 is a graph of FTIR spectra illustrating the interaction of tripeptide glutathione with the evanescent field of propagating IR light in the first example microfluidic device configuration of FIG. 5. The spectra are absorption spectra of the IR light that has propagated through the first and second waveguides 420, 430. Specifically, the spectrum 610 represents the spectrum of the IR light that has propagated through the first waveguide 420 and therefore corresponds to the glutathione in the acidic solution. The spectrum 620 represents the spectrum of the IR light that has propagated through the second waveguide 430 and therefore corresponds to the glutathione in the basic solution.

The differences between the first and second absorption spectra 610, 620 are apparent. In the spectrum 620, the absorption band between 1600 cm$^{-1}$ and 1700 cm$^{-1}$ is reduced in intensity, while the rest of the spectrum 620 is not varied due to the reaction that occurs at the COOH molecular group.

In this example, the first and second absorption spectra 610, 620 were calculated based on the Beer-Lambert law:

$$S_j = -\log(SF_j/Si_j),$$

where the index j is either 1 or 2, designating the waveguide from which the signal is obtained (the first waveguide 420 or the second waveguide 430). $Si_j$ is the initial spectrum in the respective first and second channels 420, 430, obtained when both channels are filled with reference fluid (such as water). $SF_j$ is the final spectrum, obtained upon flow of glutathione solutions with appropriate pH through the channels.

Figure 7:
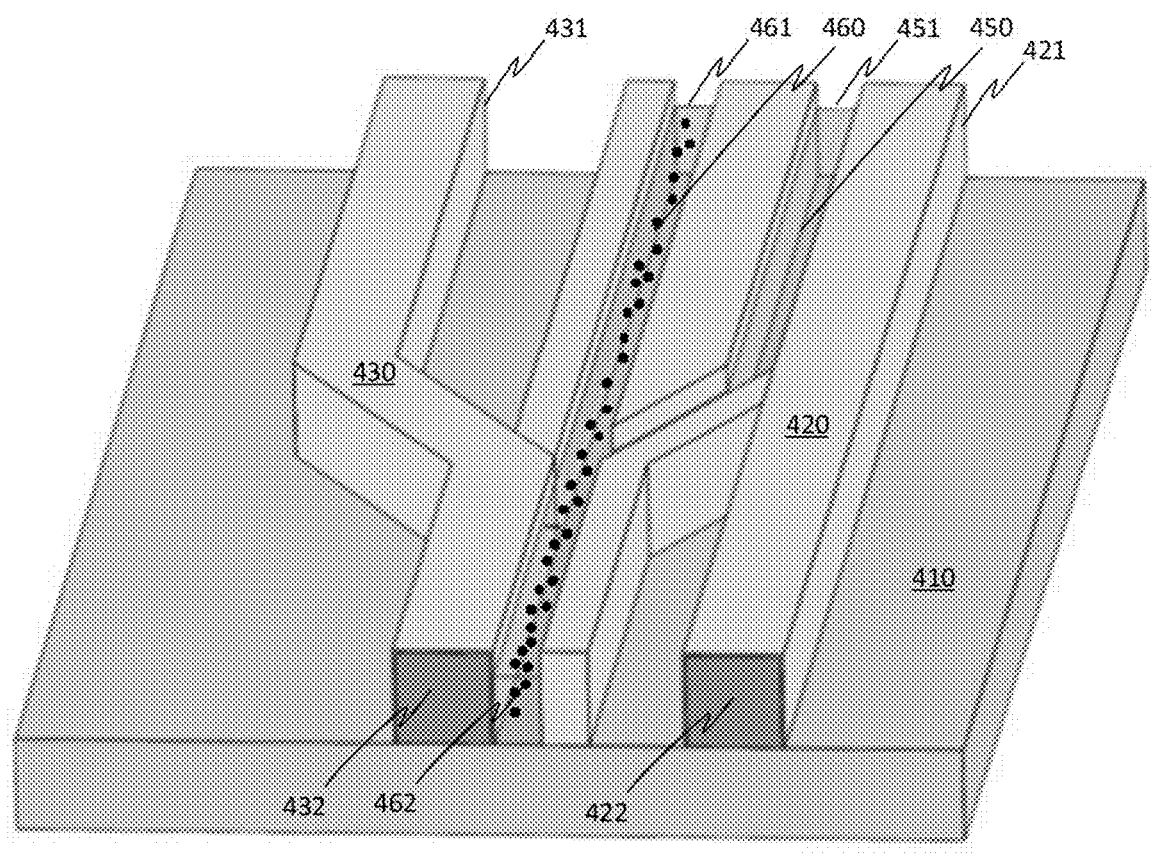
FIG. 7 is an isometric view of the microfluidic device of FIG. 4A operating in a second example configuration.

FIG. 7 is an isometric view of the microfluidic device of FIG. 4A operating in a second example configuration, namely to detect the presence of bacteria in a bodily fluid (e.g., urine). In this example, IR light is provided to the first end face 421 of the first waveguide 420 and the first end face 431 of the second waveguide 430. After propagation, the IR light emerges from the second end face 422 of the first waveguide 420 and the second end face 432 of the second waveguide 430, where IR detectors (not shown) capture the IR light and produce electrical signals based thereon.

A first fluid (unreferenced) is caused to flow into the first channel 450 via the first inlet/outlet 451 thereof. The first fluid is a bodily fluid (potentially) containing bacteria. A second fluid (unreferenced) is caused to flow into the second channel 460 via the first inlet/outlet 461 thereof. The second fluid is a fluid containing functionalized (e.g., metallic) nanoparticles. The first and second fluids then mix when the first and second channels 450, 460 merge. The first and second fluids then exit via the second inlet/outlet 462.

Figure 8:
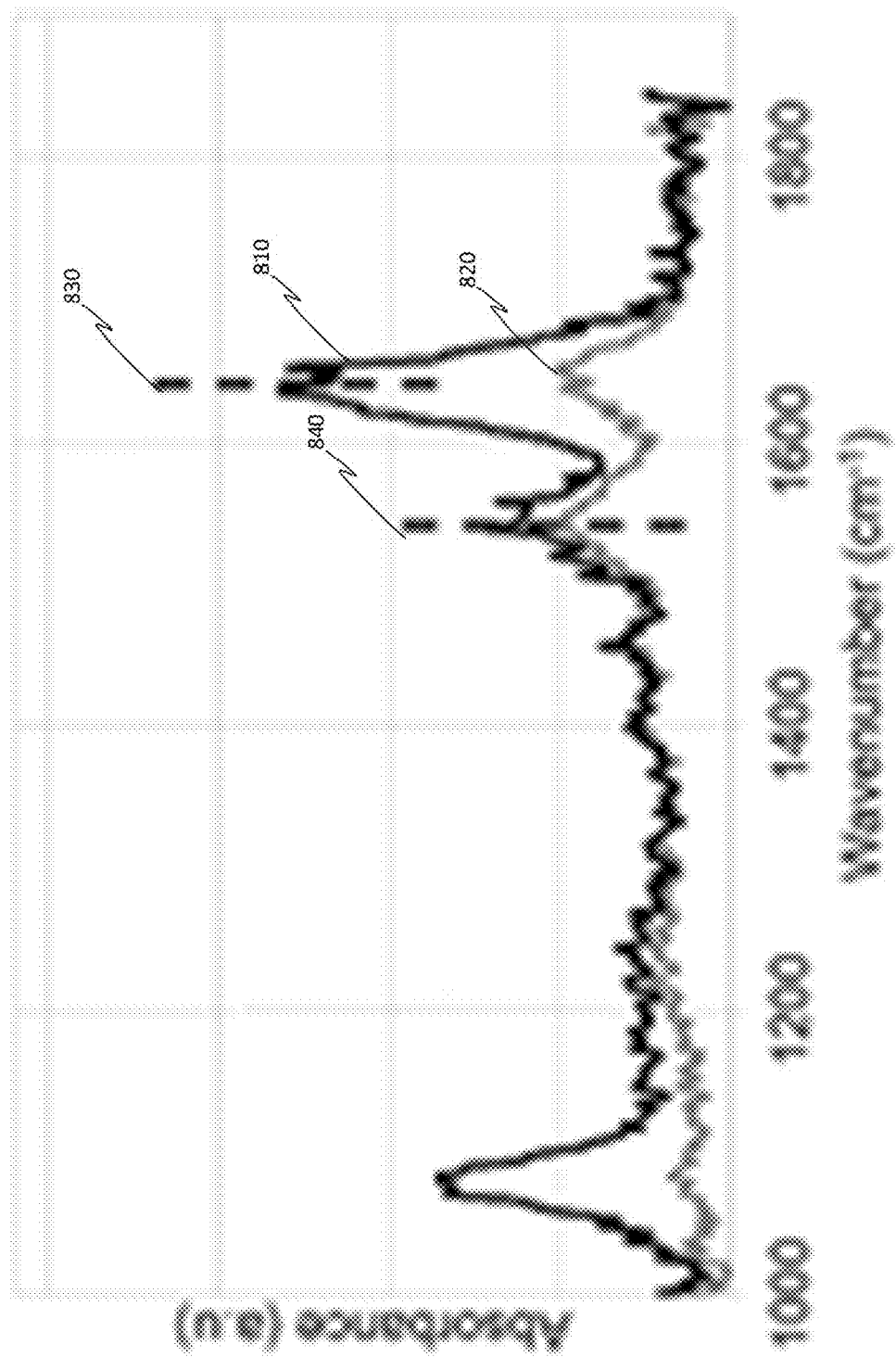
FIG. 8 is a graph of FTIR spectra illustrating the interaction of E. Coli bacteria with the evanescent field of propagating IR light in the second example microfluidic device configuration of FIG. 7.

FIG. 8 is a graph of FTIR spectra illustrating the interaction of E. Coli bacteria with the evanescent field of propagating IR light in the second example microfluidic device configuration of FIG. 7. The spectra are absorption spectra of the IR light that has propagated through the first and second waveguides 420, 430. Specifically, the spectrum 810 represents the spectrum of the IR light that has propagated through the first waveguide 420 and therefore corresponds to the bodily fluid containing bacteria. The spectrum 820 represents the spectrum of the IR light that has propagated through the second waveguide 430 and therefore corresponds to the fluid containing functionalized nanoparticles.

The spectrum 810 shows an enhanced signal in comparison to the spectrum 820 due to the surface-enhanced IR absorption (SEIRA) effect of metallic nanoparticles that are preferentially bound to bacteria. The bacterial presence is overall indicated by the "fingerprint" signature, such as the Amide I band 830 and Amide II band 840 in FIG. 8. In this case, the channel length in contact with the waveguides and channel volume should be designed to emphasize quantifiable differences in absorption.

As above, the absorption spectra 810, 820 are calculated based on the Beer-Lambert law:

$$S_j = -\log(SF_j/Si_j),$$

where the index j is either 1 or 2, designating the waveguide number from which the signal is obtained (the first waveguide 420 or the second waveguide 430). $Si_1$ is the initial spectrum in the first channel 420, obtained when the first channel 420 is filled with the bodily fluid (without bacteria) or water (without bacteria). Sit is the initial spectrum in the second channel 430, obtained when the second channel 430 is filled with a fluid containing functionalized nanoparticles (without interaction with bacteria). $SF_j$ is the final spectrum, obtained upon flow of the bodily fluid (potentially) containing bacteria through the first channel 420 and the fluid containing functionalized particles through the second channel 430.

Figure 9:
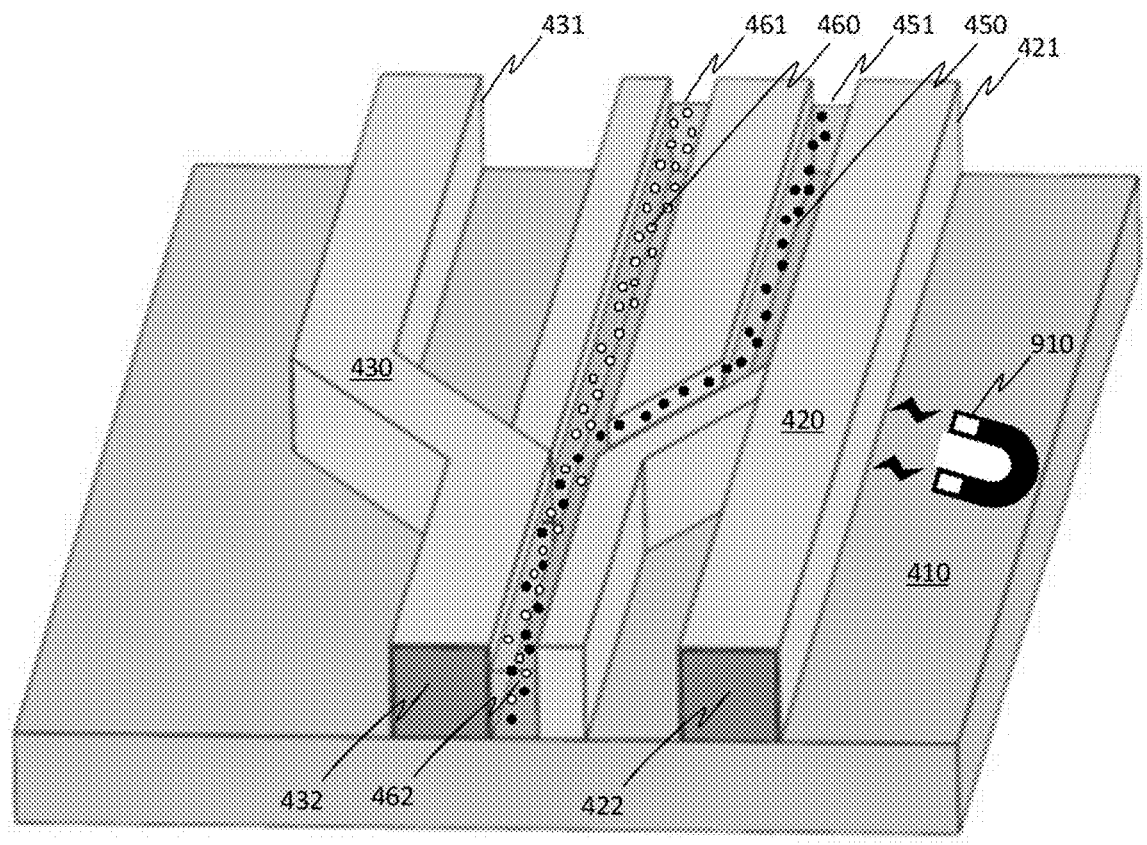
FIG. 9 is an isometric view of the microfluidic device of FIG. 4A operating in a third example configuration.

FIG. 9 is an isometric view of the microfluidic device of FIG. 4A operating in a third example configuration. Unlike the first and second examples, above, this third example employs the microfluidic device to separate rather than mix. In this third example, IR light is provided to the second end face 422 of the first waveguide 420 and the second end face 432 of the second waveguide 430. After propagation, the IR light emerges from the first end face 421 of the first waveguide 420 and the first end face 431 of the second waveguide 430, where one or more IR detectors (not shown) capture the IR light and produce electrical signals based thereon.

A fluid (unreferenced) is caused to flow into both the first and second channels 450, 460 via the second inlet/outlet 462 thereof. The fluid is a bodily fluid containing cells labeled with antibodies and beads of a magnetic substance (unreferenced) for which the antibodies of the cells have an affinity. A magnet 910 proximate the first channel 450 separates the magnetic beads, causing them to enter and flow through the first channel 450 as FIG. 9 shows. The separated fluids then exit via the first inlet/outlet 451 and the first inlet/outlet 461. The spectrum obtained from the second waveguide 430 exhibits absorption bands due to all of the fluid components. The spectrum obtained from the first waveguide 420 exhibits features from concentrated, separated cells attached to the beads, and attracted to the first waveguide 420 by the magnet 910, thereby enhancing the spectral features related to the attached cells.

As above, the absorption spectra are calculated based on the Beer-Lambert law:

$$S_j = -\log(SF_j/Si_j),$$

where the index j is either 1 or 2, designating the waveguide number from which the signal is obtained (the first waveguide 420 or the second waveguide 430). $Si_j$ is the initial spectrum in the first and second channels 420, 430, obtained when the first and second channels 420, 430 are filled with the bodily fluid (without cells) or water (without cells). $SF_j$ is the final spectrum, obtained upon flow of the bodily fluid containing cells.

Figure 10:
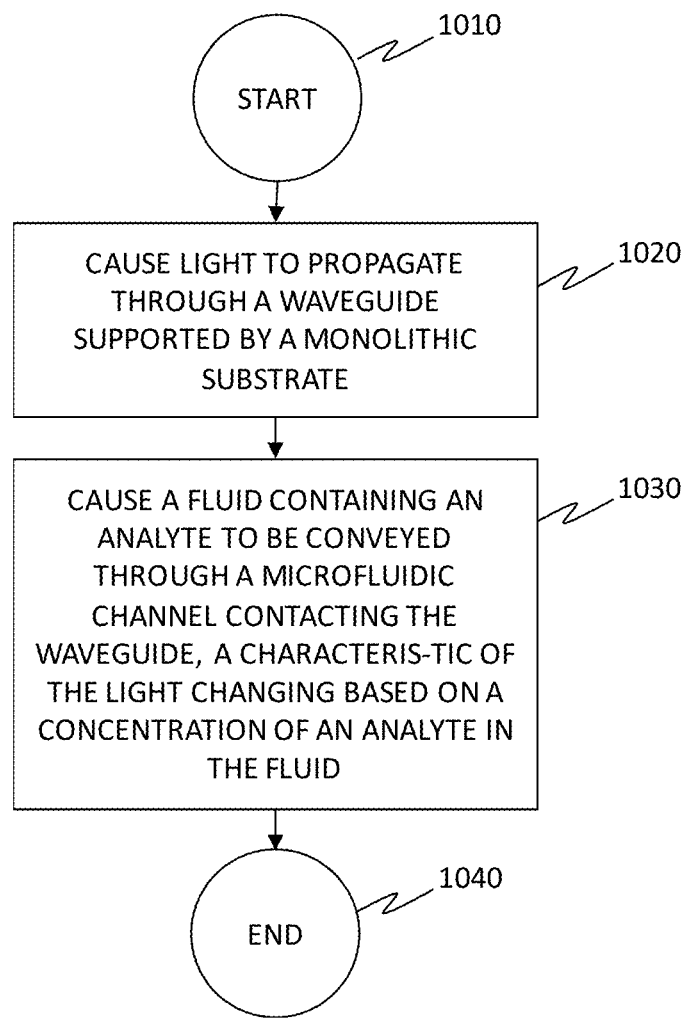
FIG. 10 is a flow diagram of one embodiment of a method of detecting the presence of an analyte in a fluid using a microfluidic device.

FIG. 10 is a flow diagram of one embodiment of a method of detecting the presence of bacteria in a fluid using a microfluidic device. The method begins in a start step 1010. In a step 1020, causing light to propagate through a waveguide supported by a monolithic substrate. In a step 1030, causing a fluid containing an analyte to be conveyed through a microfluidic channel contacting the waveguide, a characteristic of the light changing under influence of an analyte in the fluid. The method ends in an end step 1040.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:

1. A microfluidic device, comprising:
   a substrate;
   a first waveguide supported by said substrate and configured to convey a first light stream from a first light source;
   a second waveguide supported by said substrate and configured to convey a second light stream from a second light source; and
   a microfluidic channel structure comprising a first channel, a second channel, and a merged channel, wherein each of said first channel, said second channel, and said merged channel are formed by said first and second waveguides and a plurality of partitioning features that cooperate with each other to form walls for said first channel, said second channel, and said merged channel;
   wherein;
      said merged channel contacts said first waveguide and is configured to convey a fluid comprising a first analyte and second analyte, wherein a first characteristic of said first light stream in said first waveguide is configured to change under an influence of the first analyte in said fluid in said merged channel; and
      said second channel contacts said second waveguide and is configured to convey a fluid comprising a first analyte and a second analyte, wherein a second characteristic of said second light stream in said second waveguide is configured to change under an influence of the second analyte in said fluid in said second channel.

2. The microfluidic device as recited in claim 1 wherein said first and second analytes are selected from the group consisting of:
   a bacterium,
   a peptide,
   a lipid,
   a protein,
   a virus,
   a cell, and
   a fungus.

3. The microfluidic device as recited in claim 1 wherein said first and second light streams are infrared light.

4. The microfluidic device as recited in claim 1 wherein said first and second characteristics are absorption spectrums of said first and second light streams.

5. The microfluidic device as recited in claim 1 wherein said influence of said first analyte and said influence of said second analyte are attenuated total reflection.

6. The microfluidic device as recited in claim 1 wherein said first and second waveguides and said plurality of partitioning features are formed from said substrate.

7. The microfluidic device as recited in claim 1 wherein a sealing material seals said first channel, said second channel, and said merged channel.

8. The microfluidic device as recited in claim 1 wherein each of said first and second waveguides comprise a cladding layer.

9. The microfluidic device as recited in claim 1 wherein a film coats walls of said microfluidic channel structure, including portions of said first and second waveguides, said film configured to increase said influence of said first analyte and said influence of said second analyte.

10. The microfluidic device as recited in claim 1 wherein a metal coats said first and second waveguides, said metal configured to increase surface-enhanced infrared absorption.

11. The microfluidic device as recited in claim 1 further comprising a first shutter configured to perform one of:
   intermittently blocking said first light stream from entering said first waveguide, and
   intermittently blocking said first light stream exiting said first waveguide.

12. A microfluidic device, comprising:
   a substrate;
   a first waveguide supported by said substrate and configured to convey a first light stream from a first end face to a second end face thereof;
   a first light source configured to provide said first light stream to said first end face of said first waveguide;
   a second waveguide supported by said substrate and configured to convey a second light stream from a first end face to a second end face thereof;

a second light source configured to provide said second light stream to said first end face of said second waveguide;

a first light detector configured to receive light from said second end face of said first waveguide and produce a first signal based thereon;

a second light detector configured to receive light from said second end face of said second waveguide and produce a second signal based thereon; and a microfluidic channel structure comprising a first channel, a second channel, and a merged channel, wherein each of said first channel, said second channel, and said merged channel are formed by said first and second waveguides and a plurality of partitioning features that cooperate with each other to form walls for said first channel, said second channel, and said merged channel;

wherein;

said merged channel contacts said first waveguide and is configured to convey a fluid comprising a first analyte and a second analyte, wherein a first characteristic of said first light stream in said first waveguide is configured to change under an influence of the first analyte in said fluid in said merged channel, said first characteristic being evident in said first signal; and said second channel contacts said second waveguide and is configured to convey a fluid comprising a first analyte and a second analyte, wherein a second characteristic of said second light stream in said second waveguide is configured to change under an influence of the second analyte in said fluid in said second channel said second characteristic being evident in said second signal.

13. The microfluidic device as recited in claim 12 wherein said first and second analytes are selected from the group consisting of:
a bacterium,
a peptide,
a lipid,
a protein,
a virus,
a cell, and
a fungus.

14. The microfluidic device as recited in claim 12 wherein said influence of said first analyte and said influence of said second analyte are attenuated total reflection.

15. The microfluidic device as recited in claim 12 wherein a film coats walls of said microfluidic channel structure, including portions of said first and second waveguides, said film configured to increase said influence of said first analyte and said influence of said second analyte.

16. The microfluidic device as recited in claim 12 wherein a metal coats said first and second waveguides, said metal configured to increase surface-enhanced infrared absorption.

17. The microfluidic device as recited in claim 12 further comprising at least one of:
a first shutter located between said first light source and said first end face and configured intermittently to block said first light stream from entering said first waveguide, and
a second shutter located between said second end face and said first light detector and configured intermittently to block said first light stream from entering said first light detector.

* * * * *